(12) United States Patent
Raffestin

(10) Patent No.: US 6,342,779 B1
(45) Date of Patent: Jan. 29, 2002

(54) METHOD OF CONTROL BY PHASE ANGLE

(75) Inventor: Luc Raffestin, Valence (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/622,587

(22) PCT Filed: Feb. 16, 1999

(86) PCT No.: PCT/FR99/00342
  § 371 Date: Aug. 21, 2000
  § 102(e) Date: Aug. 21, 2000

(87) PCT Pub. No.: WO99/43075
  PCT Pub. Date: Aug. 26, 1999

(30) Foreign Application Priority Data

Feb. 20, 1998 (FR) .............................. 98 02087

(51) Int. Cl.$^7$ .............................. G05F 1/40; H02J 3/08
(52) U.S. Cl. .................. 323/237; 323/326; 315/194
(58) Field of Search ................... 323/237, 273, 323/281, 282, 235, 322, 326, 320; 315/199, 294, 307, 368, 194; 307/126, 66

(56) References Cited

U.S. PATENT DOCUMENTS 3,588,598 A * 6/1971 Isaacs ..................... 315/199
3,684,919 A * 8/1972 Cramer .................... 315/194
5,541,458 A * 7/1996 Hirst ...................... 307/66

* cited by examiner

Primary Examiner—Rajnikant B. Patel
(74) Attorney, Agent, or Firm—Oblon, Spivak, McClelland, Maier & Neustadt, P.C.

(57) ABSTRACT

In order to produce a phase control device which is free of the constraints of drifts due to the supply frequency or to the temperature of the components forming it, a method is recommended in which a command signal delivered by a control is modified by a converter in order that the activity of the actuator controlled by this device is a linear function, in all cases, of a control signal. As an improvement, account is taken of the variation in frequency of the supply signal by multiplying the convertible signal by a measurement of the duration of the period of the power signal.

8 Claims, 5 Drawing Sheets

TABLE 1

| K | K' | K | K' | K | K' | K | K' |
|---|---|---|---|---|---|---|---|
| 0 | 255 | 64 | 161 | 128 | 127 | 192 | 93 |
| 1 | 233 | 65 | 161 | 129 | 127 | 193 | 93 |
| 2 | 228 | 66 | 160 | 130 | 126 | 194 | 92 |
| 3 | 224 | 67 | 159 | 131 | 126 | 195 | 91 |
| 4 | 221 | 68 | 159 | 132 | 125 | 196 | 91 |
| 5 | 218 | 69 | 158 | 133 | 125 | 197 | 90 |
| 6 | 215 | 70 | 158 | 134 | 124 | 198 | 90 |
| 7 | 213 | 71 | 157 | 135 | 124 | 199 | 89 |
| 8 | 211 | 72 | 156 | 136 | 123 | 200 | 88 |
| 9 | 209 | 73 | 156 | 137 | 123 | 201 | 88 |
| 10 | 208 | 74 | 155 | 138 | 122 | 202 | 87 |
| 11 | 206 | 75 | 155 | 139 | 122 | 203 | 86 |
| 12 | 205 | 76 | 154 | 140 | 121 | 204 | 86 |
| 13 | 203 | 77 | 154 | 141 | 121 | 205 | 85 |
| 14 | 202 | 78 | 153 | 142 | 120 | 206 | 84 |
| 15 | 200 | 79 | 153 | 143 | 120 | 207 | 84 |
| 16 | 199 | 80 | 152 | 144 | 119 | 208 | 83 |
| 17 | 198 | 81 | 151 | 145 | 119 | 209 | 82 |
| 18 | 197 | 82 | 151 | 146 | 118 | 210 | 82 |
| 19 | 196 | 83 | 150 | 147 | 118 | 211 | 81 |
| 20 | 195 | 84 | 150 | 148 | 117 | 212 | 80 |
| 21 | 193 | 85 | 149 | 149 | 117 | 213 | 80 |
| 22 | 192 | 86 | 149 | 150 | 116 | 214 | 79 |
| 23 | 191 | 87 | 148 | 151 | 116 | 215 | 78 |
| 24 | 190 | 88 | 148 | 152 | 115 | 216 | 77 |
| 25 | 189 | 89 | 147 | 153 | 115 | 217 | 77 |
| 26 | 189 | 90 | 147 | 154 | 114 | 218 | 76 |
| 27 | 188 | 91 | 146 | 155 | 114 | 219 | 75 |
| 28 | 187 | 92 | 146 | 156 | 113 | 220 | 74 |
| 29 | 186 | 93 | 145 | 157 | 113 | 221 | 73 |
| 30 | 185 | 94 | 144 | 158 | 112 | 222 | 73 |
| 31 | 184 | 95 | 144 | 159 | 112 | 223 | 72 |
| 32 | 183 | 96 | 143 | 160 | 111 | 224 | 71 |
| 33 | 182 | 97 | 143 | 161 | 111 | 225 | 70 |
| 34 | 182 | 98 | 142 | 162 | 110 | 226 | 69 |
| 35 | 181 | 99 | 142 | 163 | 109 | 227 | 68 |
| 36 | 180 | 100 | 141 | 164 | 109 | 228 | 67 |
| 37 | 179 | 101 | 141 | 165 | 108 | 229 | 66 |

TABLE 1 (cont.)

| | | | | | | | |
|---|---|---|---|---|---|---|---|
| 38 | 178 | 102 | 140 | 166 | 108 | 230 | 66 |
| 39 | 178 | 103 | 140 | 167 | 107 | 231 | 65 |
| 40 | 177 | 104 | 139 | 168 | 107 | 232 | 64 |
| 41 | 176 | 105 | 139 | 169 | 106 | 233 | 63 |
| 42 | 175 | 106 | 138 | 170 | 106 | 234 | 62 |
| 43 | 175 | 107 | 138 | 171 | 105 | 235 | 60 |
| 44 | 174 | 108 | 137 | 172 | 105 | 236 | 59 |
| 45 | 173 | 109 | 137 | 173 | 104 | 237 | 58 |
| 46 | 173 | 110 | 136 | 174 | 104 | 238 | 57 |
| 47 | 172 | 111 | 136 | 175 | 103 | 239 | 56 |
| 48 | 171 | 112 | 135 | 176 | 102 | 240 | 55 |
| 49 | 171 | 113 | 135 | 177 | 102 | 241 | 53 |
| 50 | 170 | 114 | 134 | 178 | 101 | 242 | 52 |
| 51 | 169 | 115 | 134 | 179 | 101 | 243 | 50 |
| 52 | 169 | 116 | 133 | 180 | 100 | 244 | 49 |
| 53 | 168 | 117 | 133 | 181 | 100 | 245 | 47 |
| 54 | 167 | 118 | 132 | 182 | 99 | 246 | 46 |
| 55 | 167 | 119 | 132 | 183 | 99 | 247 | 44 |
| 56 | 166 | 120 | 131 | 184 | 98 | 248 | 42 |
| 57 | 165 | 121 | 131 | 185 | 97 | 249 | 40 |
| 58 | 165 | 122 | 130 | 186 | 97 | 250 | 37 |
| 59 | 164 | 123 | 130 | 187 | 96 | 251 | 34 |
| 60 | 164 | 124 | 129 | 188 | 96 | 252 | 31 |
| 61 | 163 | 125 | 129 | 189 | 95 | 253 | 27 |
| 62 | 162 | 126 | 128 | 190 | 94 | 254 | 22 |
| 63 | 162 | 127 | 128 | 191 | 94 | 255 | 0 |
| | | | | | | 256 | 0 |

METHOD OF CONTROL BY PHASE ANGLE

This invention relates to a method of control by phase angle which can be used in both the industrial and domestic fields. It particular, it respectively relates to the variable control of motors and light variators. The principle of the control by phase angle is to use an alternating power signal and to cause the switching in a load of this power signal at an appropriate instant, always the same, within a period of this alternating power signal. The setting of this appropriate instant with respect to an initial instant allows the power to be adjusted by synchronisation.

DISCUSSION OF THE BACKGROUND

The frequency of the power signal used is an essential characteristic of the adjusting device with uses this principle. A first problem arises from the fact of the variation in the frequencies used: that is to say 60 Hz in America and 50 Hz in Europe and the rest of the world. The design of the corresponding devices must therefore be differentiated. Furthermore, the adjustment range of the phase control is derived according to the utilisation constraints of the integrated circuit which carries out this switching function. Thus, this adjustment range is in particular dependent on the clock frequency of the microcontroller used, on its temperature and on its supply voltage. Particularly if the sensitivity of the adjustment in not linear.

This type of disadvantage may not be harmful in the case where the variator used is a manually controlled one. Even so, the ease of use thereof is affected, particularly if the results of the control become much more sensitive at one place in the adjustment range than at another place.

On the other hand, in the field of servocontrol, the variation in sensitivity encountered throughout the adjustment range with phase control devices is not tolerable. This sensitivity conditions the activity of an actuator as a function of a control signal. In effect, if the control must be a servocontrol, the open loop gain of the servocontrol can then be different depending on whether the command value is situated in one place of the adjustment range or another. In order to avoid the hunting and oscillation phenomena of the servocontrol, it is necessary to take account of the maximum gain. The consequence of this is that, in the zones of the adjustment range where the gain is low, the reactivity of the servocontrol is also low. In some way the gathering of the activity of the actuator to the command value imposed on it is more or less rapid depending on the sensitivity of the adjustment range in question.

SUMMARY OF THE INVENTION

The purpose of the invention is to overcome this problem by providing in the control circuit a means of linearizing the activity of the actuator used (a lamp, a heating appliance, a motor or something else) with respect to the available control signal. This means is interposed between the command circuit and the actuator used. It will be shown that this procedure results in the solving of all the problems mentioned above.

The invention therefore relates to a method of control in which a periodic electrical signal is applied to an actuator by the intermediary of a switch with automatic cutoff, a control signal is produced, a time difference of an appropriate control instant is determined with respect to a characteristic instant of this periodic signal as a function of this control signal, the periodic closing of the switch is commanded at this appropriate instant in each period by applying this control signal to the switch, the activity of the actuator is adjusted by modifying the control signal, characterized in that the control signal is converted by a conversion into a different converted signal whose application causes a linear behaviour of the activity of the actuator as a function of this control signal and the converted signal is used to determine the time difference. When the activity is speed, the conversion is advantageously of the arcsine type. When the activity is power, the conversion is advantageously of the arcsine squared type.

BRIEF DESCRIPTION OF THE DRAWINGS

The invention will be better understood on reading the following description and on examining the accompanying figures. The latter are given only by way of indication and are in no way limitative of the invention. The figures show.

Table 1: a reciprocal conversion table corresponding to power linearizing.

DESCRIPTION OF THE PREFERRED EMBODIMENT

Figure 1:
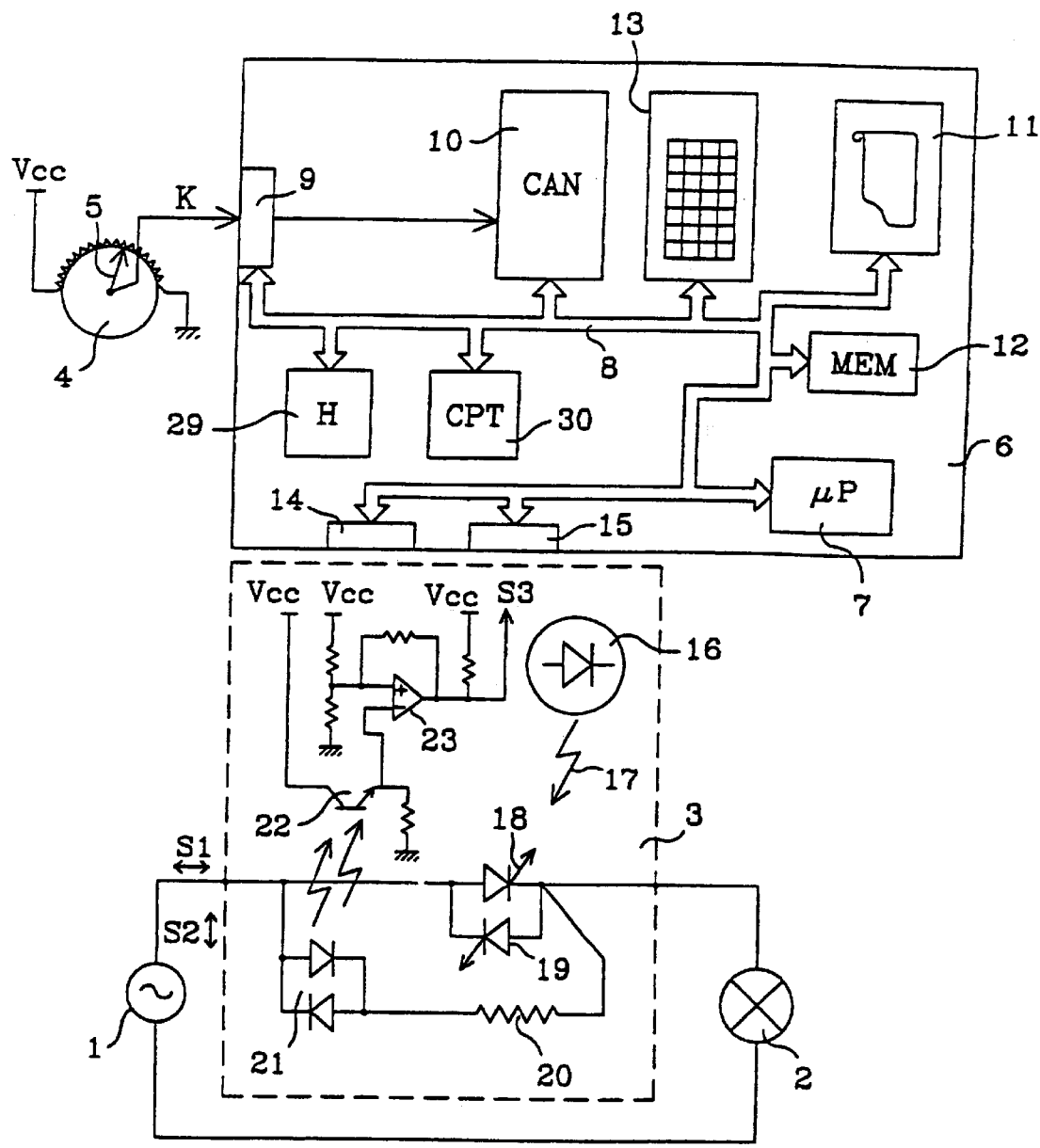
FIG. 1: a device which can be used for implementing the method of the invention.

FIG. 1 shows a device which can be used for implementing the method of the invention. A periodic electrical signal S1 is supplied by an electrical source 1. It is applied to an actuator 2 by the intermediary of a switch 3 with automatic cutoff. As will be seen below, the switch 3 essentially comprises triacs, or thyristors. In the latter, conduction is caused at a particular time in the cycle of the periodic signal produced by the source 1. This conduction cuts off automatically when this electrical signal reverses its polarity. A potentiometer 4, or a similar device, makes it possible to produce a control signal K.

As the method of the invention is a method of control by phase angle, a time difference between an appropriate command instant of the switch 3 is marked with respect to a characteristic instant of the periodic signal S1. In practice, the characteristic instant of the signal S1 is an instant at which the voltage of this signal passes through zero, when polarity changes. It will be seen below that this instant can, in certain cases, be difficult to measure and it is convenient to take account of the deviation, of the measuring error produced, in the detection of this characteristic instant.

In other words, the time difference of an appropriate control instant is determined with respect to a characteristic instant of the periodic signal as a function of the control signal K.

In a usual way, the signal K is a linear function of the time difference which is required to be imposed. For example, if the value of the signal K is at 100% of its useful value, the delay in switching on the switch will be zero. On the other hand, if the value of K is 0%, the delay in switching on the switch 3 will be total: equal to one half-period of the periodic signal. The switch 3 will not therefore be switched on. In this way, the activity of the actuator 2 is adjusted by modifying the control signal, in practice here by modifying the position of the cursor 5 of the potentiometer 4. The potentiometer 4 is powered between VCC and earth. Its cursor supplies a voltage proportional to VCC. The signal K in this example is analogue.

In the invention, the control signal K is converted by a conversion into a converted signal K' whose application then causes a linear behaviour of the activity of the actuator as a function of this control signal K. The activity which will be dealt with in the rest of this description is the power developed by the actuator 2. This can be another parameter: for example its speed. If it is a matter of a heating element, this can be its temperature, or luminosity if it is a matter of electrical lighting.

In the invention, a microcontroller 6 is preferably used to convert a control signal K. The microcontroller 6 essentially comprises an arithmetic and logic unit 7 serving as a microprocessor. The microprocessor 7 is connected by an instruction, address and data bus 8 with an input interface 9, an analogue to digital converter 10, a program memory 11 and a working memory 12 provided with registers. According to what will be explained below, the conversion of the signal can be calculated on demand, or preferably it can be pre-calculated. In the latter case, the preliminary calculations are recorded in a non-volatile memory 13 of the microcontroller 6 in the form of a table. In order to control the actuator 2, the microcontroller 6 comprises two more registers 14 and 15 respectively making it possible to have a logic status, relative to the real instant of presence of the characteristic instant in the period, and the control to be imposed on the switch 3.

The switch 3 is preferably a switch of the optocoupler type. It comprises a light emitting diode 16 connected to the register 15 and which emits luminous radiation 17 when the content of the register 15 is active (logic state 1). It does not emit in the opposite case. The light 17 emitted by the diode 16 excites the gates 18 of a set 19 of triacs connected head-to-tail. These triacs 19 are furthermore inserted in series in the circuit connecting the source 1 to the actuator 2. The instant at which the diode 16 emits is the appropriate instant. At the start of each alternation, when the set 19 of triacs is not conducting, the source 1 is connected to the actuator 2 by a branch comprising a resistor 20 and a set of light emitting diodes 21. The light emitting diodes 21 excite the base, of a phototransistor 22 whose emitter is connected to an input of a high-gain operational amplifier 23. The output of the operational amplifier 23 delivers an electrical state representative of the state of conduction of one of the diodes of a set of diodes 21.

In principle, at the start of each alternation, when the set of triacs is in the open circuit state, the signal delivered by the amplifier 23 is conventionally in the 0 state. It changes to the 1 state when the diodes 21 are short-circuited by the conducting triacs 19. This logic state is stored in the register 14. The optocoupler 3 is therefore connected on the one hand to the load 2 and to the source 1 and, on the other hand, to the microcontroller 6.

Figure 2A:
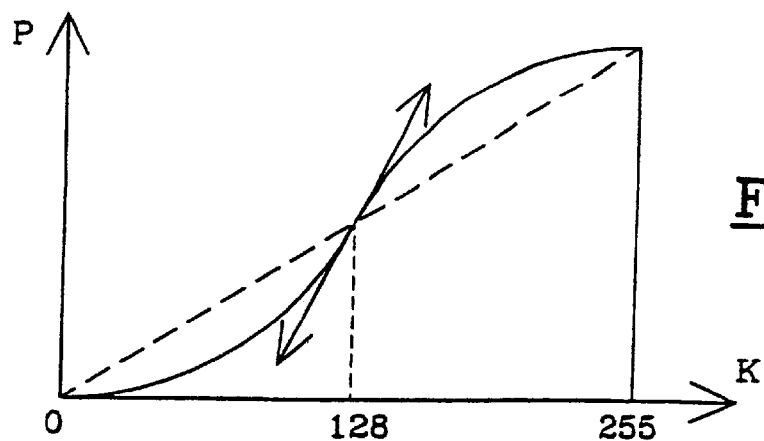
FIGS. 2a and 2b: the representations of a normal transfer function and of the reciprocal transfer function used, in the invention, for correcting the non-linearity of this normal transfer function.
Figure 2B:
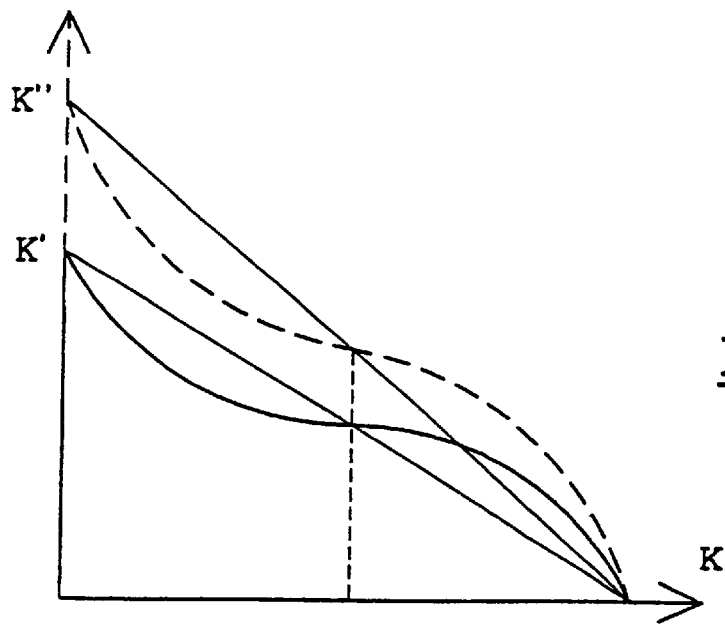

FIGS. 2a and 2b show the usual effects of a phase control circuit of the prior art. FIG. 2a gives information on the monitored activity as a function of the imposed control value K. For example, the monitored activity is power. Taking account of the principles of phase control (application of the power during portions of the period) and of the necessity of squaring the voltage in order to determine the power, the latter can be expressed as a function of K as follows:

$$P = K - (255/2\pi) \cdot (\sin 2\pi K/255) \quad \text{Formula 1}$$

In this formula, K, which in a standardized way can have one of the values between 0 and 1, has been quantified in 8 bits and can thus have a binary value from 0 to 255. It can easily be seen that the gain of the transfer function is maximum for K=128 and that it is very low for K in the region of 0 or 255. The problem of gathering for the value 0 is not very serious, taking account that the dissipated power must be zero; it is easy to gather. On the other hand, for high values, the reactivity of the servocontrol which would use these values would be reduced. The digitized value of K is obtained by sampling the analogue value delivered by the potentiometer to the input 9 and by making it undergo an analogue to digital conversion by the intermediary of the converter 10. The value K, thus standardized over eight bits, can be stored in one of the working registers of the memory 12.

In the invention, in order to linearize the control phenomenon, provision has been made to replace the value K by a value K', as shown in FIG. 2b which shows K as an abscissa and K' as an ordinate.

FIG. 2b in fact shows the reciprocal transfer function corresponding to the preceding formula. Taking account of the complex character of this preceding formula, it is not possible to have a simple analytical reciprocal transfer function K=f(P). K is here the inverse of the delay with which the set of triacs is triggered at the appropriate instant with respect to the characteristic instant. If K is zero, the delay is maximum and the dissipated power is zero. On the other hand, if K is nominal, the delay is zero and the dissipated power is maximum. FIG. 2b, in addition to the reciprocal function, carries out, in the present case, an inversion of the value of K. In effect, rather than working on the inverse of the delay, it has been preferred to work on the delay itself: is the typical value which can be used for controlling the switch 3.

Figure 3:
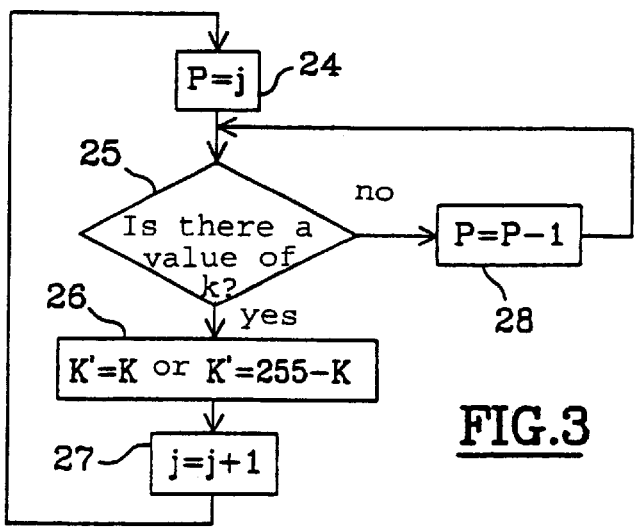
FIG. 3: a diagrammatic representation of a method of generating the reciprocal function.

The obtaining of the reciprocal (and inverse if necessary) transfer function shown in FIG. 2b is tabulated in the memory 13 from the knowledge of the calculation of the transfer function of FIG. 2a. The calculation of this transfer function is expressed in the form of a table comprising, on the left, values of K varying from 1 to 255 for each line of the table and, on the right in each line, the value of the power P corresponding to the above formula. From this table, as shown in FIG. 3, it is possible to read backwards, by dichotomy. Thus, during a step 24, a value P=j (j is equal to 0 at the beginning) is sought in this table. In a step 25, the table is searched to see if there is a corresponding value of K for this value P=j. If such a value is found, it is said, in a step 26, that the value K' is equal to K (or to 255−K if there is inversion). Then, in step 27, the process is repeated by incrementing j to j+1 until j reaches 255. If the chosen value of P does not correspond to a value in the table, P is modified to P−1 and the test is repeated. It is repeated until a value of P is found for which there is a value of K in the table. For the starting value of P=j, the value of K is attributed, and therefore the corresponding found value of K'. By doing this, a table is available having as input (addresses) the values of P and as output (in the data stored at these addresses), the values of K'. It is therefore possible to produce a table comprising, as input, the values of K (such as supplied by the potentiometer 4) and, as output, the values of K' whose application as control (or as command in the servocontrol) linearizes the control of the phenomenon. Another formula is used for another phenomenon. Table 1 shows the tabulated conversion carried out in the case of control of power.

FIG. 2b shows the reciprocal (and inverse) transfer function. It also shows a modification of the calculation of K' associated with the variation, together, in the conditions of use of the microcontroller 6 and in the frequency of the alternating signal S1. In effect, if the period of this alternating signal is longer (its frequency is lower), it is important in order to control the actuator 2 with the appropriate phase, to consequently delay the application of the light pulse 17 to the triacs 19. In fact, for a calculated value of K', the delay to be imposed is not K' but K" which takes account of the real period of the signal S1, measured in the real conditions of use of the microcontroller 6.

Figure 4:
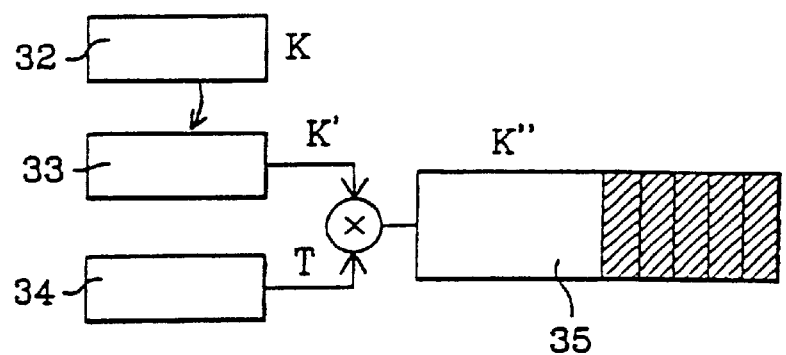
FIG. 4: a diagrammatic representation of a method of generating the linearity correction as a function of the tabulated expression of the reciprocal function.
Figure 5:
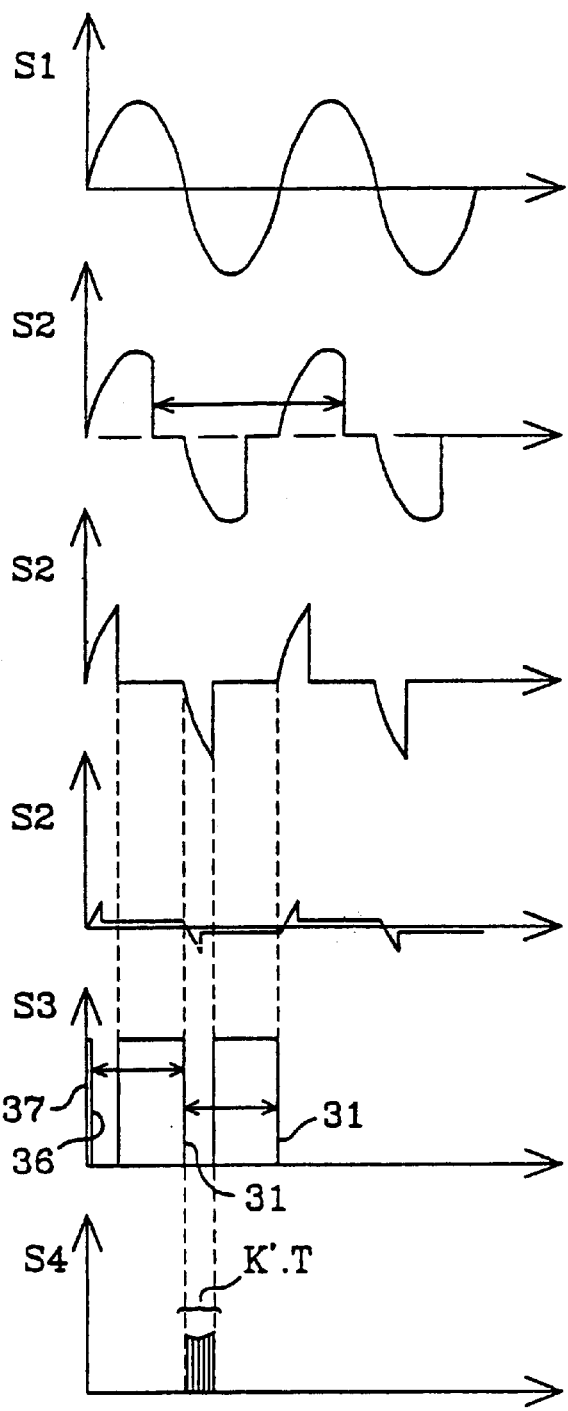
FIG. 5: diagrams of the signals which can be used in the method of the invention, plotted against time.

For this purpose, this microcontroller has a clock 29 connected to a counter 30. The clock 29 is for example a 15 KHz clock, the counter 30 being an eight bit counter. FIGS. 4 and 5 make it possible to understand the functioning of this counter. In FIG. 5, signals varying with time can be seen representing, respectively, the electrical power signal S1, a signal S2 passing into the set of diodes 21 and a counting signal S3. The signal S3 is the one which is stored temporarily in the register 14.

The signal S2 is shown for different values of control phase angle. In the top part, the control is at 33%, in the central part it is at 66% and in the bottom part it is at 100%. The signal S3 has positive pulses when the current passes into the triacs 19. It is possible, with the microprocessor 7 receiving the binary state S3 in the register 14, to detect the falling edges 31 of S3 in order to reset the counter 30 to 0 and to initiate the counting. By doing this, the counter 30 is capable, at the end of a half-period, of producing a result, stored in a register of the memory 12, corresponding to the duration of the half-period of S1, and therefore corresponding to the period of S1.

FIG. 4 shows three registers of the memory 12. A first register 32 contains the value K such as it is digitized by the analogue to digital converter 10. A second register 33 shows the value K' corresponding to the value K, after it has been extracted from table 1 of the memory 13. In practice, this extraction is carried out by entering the value K as an address of the table of the memory 13 and by reading the value K' stored at that address in that memory. The binary count corresponding to the duration of the period is stored in a register 34 of the memory 12.

In synchronism and before the resetting to zero of the counter, the microprocessor 7 reads the contents of the registers 33 and 34 and the multiplication of one by the other is caused in order to store the result K" thereof in a register 35. In a preferred manner, the registers 33 and 34 are eight bit registers. Register 35 is therefore normally a 16 bit register. In order to standardize the calculation, the resultant value is divided by 255 which is equivalent to a truncation of the eight least significant bits of the register 35. In the eight most significant bits of the register 35, there is then a value representative of the duration during which it is necessary to wait before commanding the emission of the luminous excitation 17.

For this triggering, the microprocessor 7 continuously compares the state of the counter 30 with the eight most significant bits stored in the register 35. This comparison is shown diagrammatically by the signal S4 of FIG. 5 where the clock pulses are present during a duration corresponding to the opening of the switch 3 (this is the 33% control). When the counter 30 arrives at the count of the register 35, the microprocessor 7 loads into the register 15 a bit representing the activation of the excitation 17. This activation stops automatically with the reversal of polarity by switching off the thyristors. The process then starts again for the next period.

By operating in this way, the deviations in functioning due to both the microcontroller 6 and the power supply of the source 1 are accounted for in a particularly simple manner.

It will be noted that if the control is at 100%, the fact of maintaining the diode 16 permanently on causes a loss of synchronisation and deviation correction information. This is not however a hindrance, considering that in these conditions the actuator is functioning with its maximum activity and it is impossible to do better than this.

FIG. 5 also shows a slight delay 36 in the triggering, with respect to the instant 37 at which the alternating signal S1 passes through zero. It is possible to take account also, in the signal S4, of this difference by replacing the comparison of the binary count of the counter 30 with the value K'T by a comparison with the value K'T—the difference at the origin. This means that even this difference will be corrected. As a variant, the table of the memory 13 is corrected consequently.

In this case the control will be perfectly linear: there will no longer be any difference at the origin. The measurement of the difference at the origin is preferably carried out when the installation is switched on. This means that, at the moment of putting into service, the switch 3 does not control the actuator 2 during a double alternation of the signal S1. On the other hand, the diodes 21 detect the passage of the signal S1 through zero as very short signals. At the moment of these passages through zero, the signal S3 rises to 1. In fact, the very short duration during which the signal S3 is rising to 1 is equal to double the difference 37–36. In effect, it includes the part before the passage through zero and the part after the passage through zero. The duration of this very short pulse is measured with the counter 30. The result is stored in a register of the memory 12. In order to obtain a useful correction value, it suffices to divide this result by two. In practice, the least significant bit of the obtained count is dropped.

At 50 Hz, the period T of the alternating signal is of the order of 10 milliseconds. The eight bit counter 30, which is a hardware counter, is provided to count at 125 KHz. The microprocessor 6 will preferably be timed by the clock 29 at a frequency of 4 MHz. The carrying out of the multiplication of FIG. 4 will only take 32 microseconds in practice, that is to say 3/100 of the duration of a cycle. This is negligible.

In brief, there is proposed according to the invention a method of servocontrol of an actuator in which a command signal is produced, the activity of the actuator is measured as a measurement signal, the difference between this command signal and this measurement signal is measured as an error signal and the actuator is controlled with this signal, characterized in that the error signal is converted by a conversion into a different converted signal whose application to the actuator causes a linear behaviour of the activity of the actuator as a function of this error signal.

What is claimed is:

1. Method of control comprising the following steps:

applying a periodic electrical signal to an actuator by an intermediary of a switch with automatic cutoff, producing a control signal, converting the control signal by a conversion into a different converted signal whose application causes a linear behavior of the activity of the actuator as a function of this control signal, using the converted signal to determine a time difference of an appropriate control instant with respect to a characteristic instant of this periodic signal as a function of the converted control signal, applying the control signal to the switch so as to command a periodic closing of the switch at the appropriate instant in each period of the periodic electric signal, and adjusting the activity of the actuator by modifying the control signal.

2. Method according to claim 1, wherein the activity is speed and the conversion is an arcsine conversion.

3. Method according to claim 1, wherein the activity is power and the conversion is an arcsine squared conversion.

4. Method according to claim 1, wherein the conversion is carried out by a tabulation of the control signal into a converted signal.

5. Method according to claim 1, wherein:

the duration of the period of the periodic signal is measured and
the conversion is modified as a function of this measurement.

6. Method according to claim 5, wherein the conversion is multiplied by the measurement of the duration of the period of the periodic signal.

7. Method according to claim 1, wherein the switch is controlled with an optocoupler.

8. Method according to claim 5, wherein for a maximum adjustment of the activity of the actuator, the conversion is not modified as a function of the duration of the period of the periodic signal.

* * * * *

UNITED STATES PATENT AND TRADEMARK OFFICE
CERTIFICATE OF CORRECTION

PATENT NO. : 6,342,779 B1
DATED : January 29, 2002
INVENTOR(S) : Raffestin

It is certified that error appears in the above-identified patent and that said Letters Patent is hereby corrected as shown below:

Title page,
Item [86], the PCT information should read:
-- [86]  PCT No.:      PCT/FR99/00343
         § 371 Date:   Aug. 21, 2000
         § 102(e) Date: Aug. 21, 2000

Signed and Sealed this

First Day of October, 2002

*Attest:*

*Attesting Officer*

JAMES E. ROGAN
*Director of the United States Patent and Trademark Office*